(12) United States Patent
Dillon

(10) Patent No.: US 10,115,114 B2
(45) Date of Patent: Oct. 30, 2018

(54) SYSTEMS AND METHODS FOR SECURE DISTRIBUTION OF COUPONS

(71) Applicant: THE MEYERS PRINTING COMPANIES, INC., Minneapolis, MN (US)

(72) Inventor: David G. Dillon, Minneapolis, MN (US)

(73) Assignee: THE MEYERS PRINTING COMPANIES, INC., Minneapolis, MN (US)

( * ) Notice: Subject to any disclaimer, the term of this patent is extended or adjusted under 35 U.S.C. 154(b) by 1179 days.

(21) Appl. No.: 14/265,964

(22) Filed: Apr. 30, 2014

(65) Prior Publication Data

US 2015/0317662 A1 Nov. 5, 2015

(51) Int. Cl.
*G06K 9/00* (2006.01)
*G06Q 30/02* (2012.01)

(52) U.S. Cl.
CPC ......... *G06Q 30/02* (2013.01); *G06Q 30/0207* (2013.01); *G06Q 30/0225* (2013.01)

(58) Field of Classification Search
CPC . G06Q 30/0207; G06F 17/248; G06F 3/0482; G06F 3/04842
USPC ...... 382/139; 709/232; 235/462.04; 705/318
See application file for complete search history.

(56) References Cited

U.S. PATENT DOCUMENTS

| 2011/0091092 A1* | 4/2011 | Nepomniachtchi .. G06K 9/3275 382/139 |
| 2014/0184852 A1* | 7/2014 | Niemi ................. H04N 5/2356 348/239 |

* cited by examiner

*Primary Examiner* — Rutao Wu
*Assistant Examiner* — Darnell A Pouncil
(74) *Attorney, Agent, or Firm* — Patent Portfolio Builders PLLC

(57) ABSTRACT

Systems and methods for secure distribution of electronic coupons involve a mobile device receiving an electronic coupon and displaying a degraded image of the electronic coupon. A non-degraded image of the electronic coupon is displayed by the mobile device when an attempt to capture the electronic coupon is detected.

21 Claims, 6 Drawing Sheets

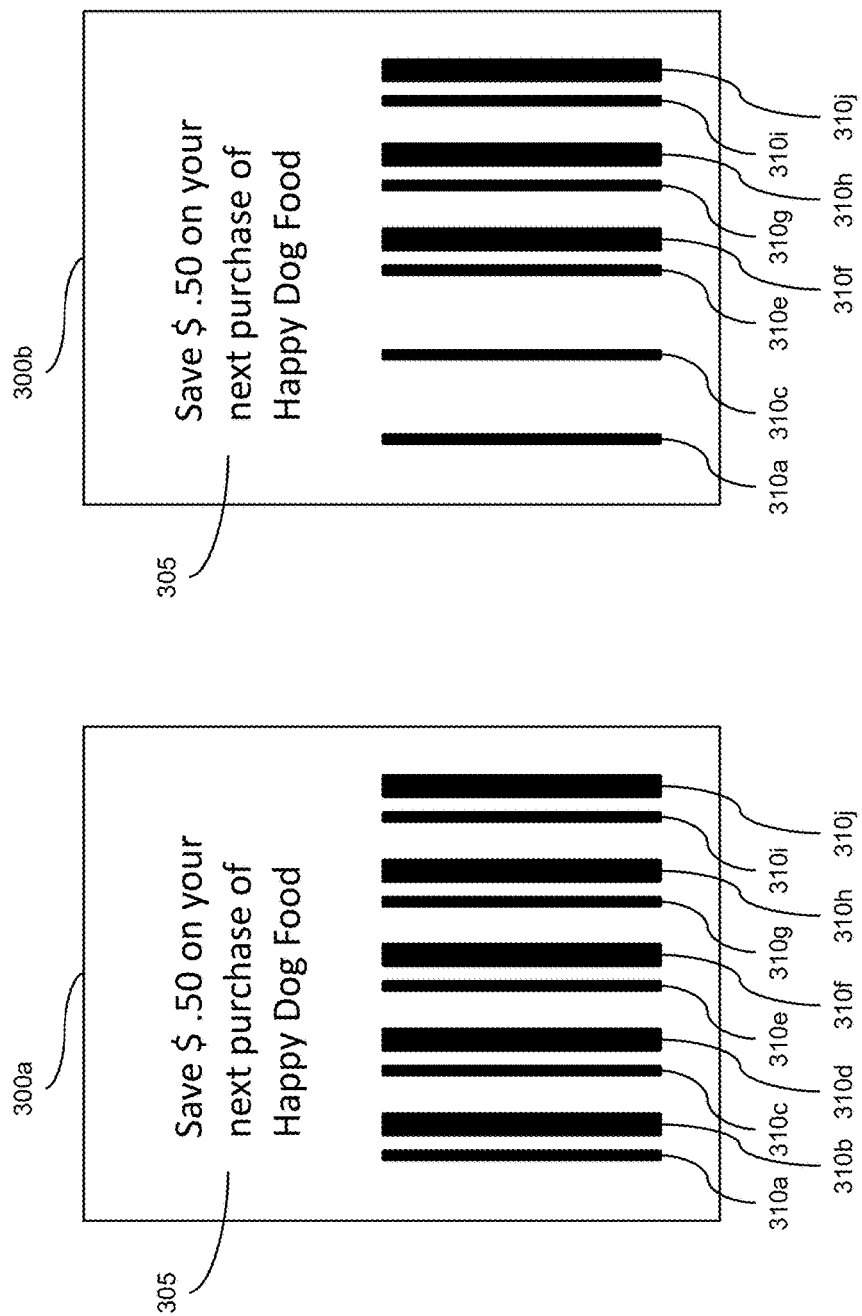

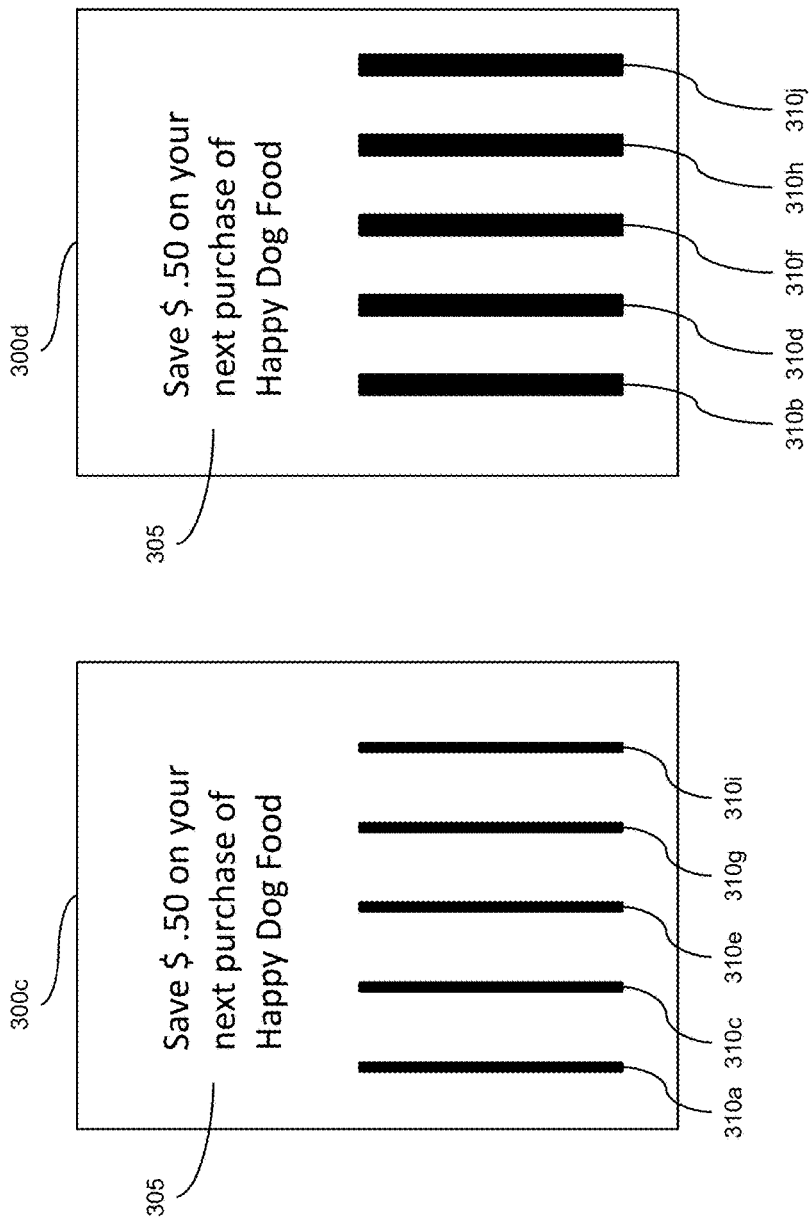

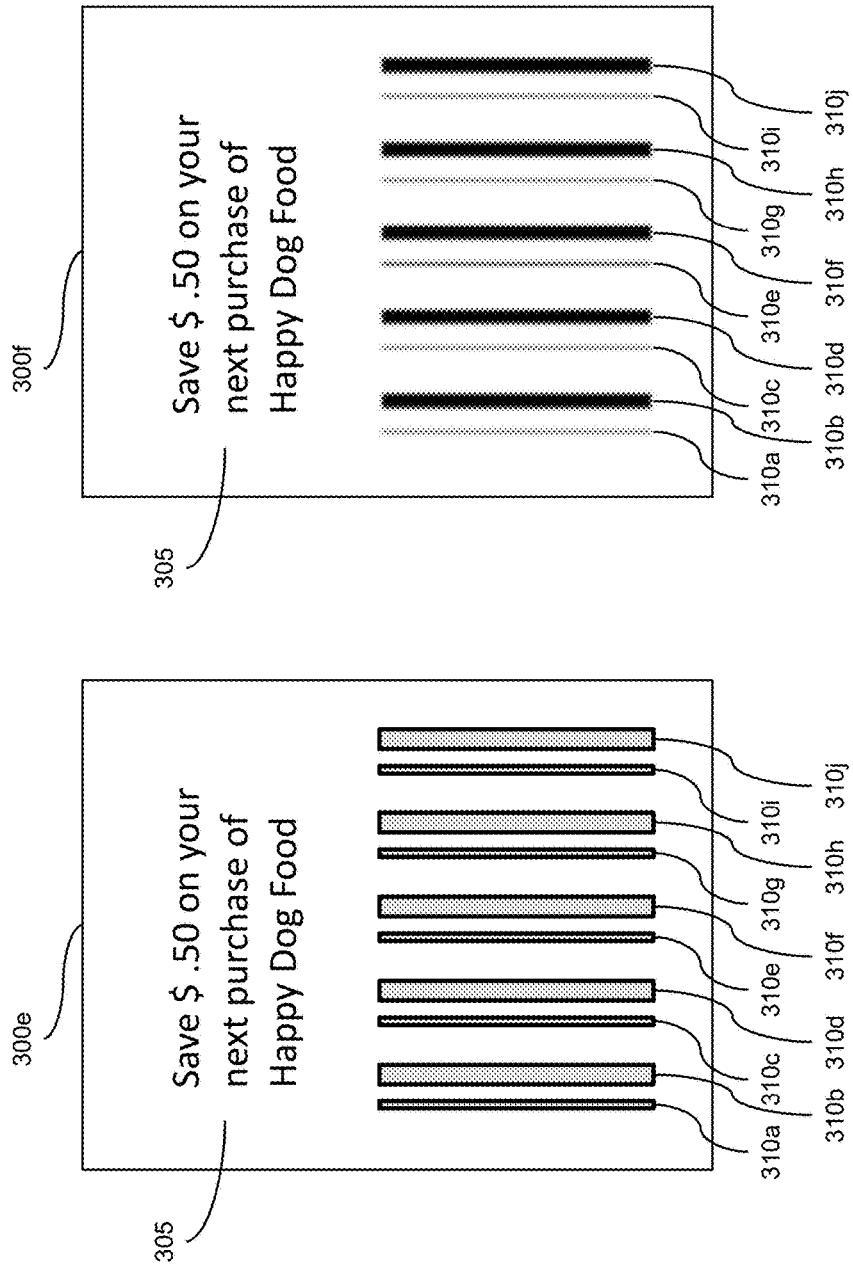

SYSTEMS AND METHODS FOR SECURE DISTRIBUTION OF COUPONS

BACKGROUND OF THE INVENTION

Coupons are a popular and convenient way for a company to promote a product or service. Coupons are typically distributed on paper and then scanned by a merchant so that the coupon is applied against a particular purchase. The merchant then typically collects all of the coupons for a particular promotion and sends them to the coupon issuer, or their agent, for reimbursement. This system protects against persons from simply reusing coupons because the merchant is only reimbursed if the merchant can return a paper copy of the coupon. Thus, the coupon issuer can ensure that only a limited number of coupons are used for a particular promotion. Despite all of this, there is significant coupon fraud, both by retailers repeatedly scanning a coupon and by consumers improperly copying and sharing coupons.

SUMMARY OF THE INVENTION

Although the return of redeemed coupons by merchants to coupon issuers provides some control on the redemption of paper coupons, it cannot be used for electronic coupons that are displayed on a consumer's device because there is no paper for the merchant to take from the consumer and provide to the coupon issuer. One technique for securing electronic coupons is to issue each electronic coupon with a unique serial number or code so that once the unique serial number or code is redeemed, the particular unique serial number or code is marked as used and prevented from being redeemed again. Although this type of system ensures that an electronic coupon can only be redeemed once, it requires a high outlay in costs because the merchant must have a way to convey the unique serial number or code that is being redeemed to the coupon issuer to confirm whether it is still valid for redemption.

Exemplary embodiments of the present invention address the above-identified and other problems that occur with the redemption of electronic coupons. In accordance with exemplary embodiments of the present invention, a degraded electronic coupon image is displayed on a user's mobile device. The electronic coupon image is degraded in such a manner to prevent the interpretation of the electronic coupon as a valid coupon. Accordingly, a screen capture of the degraded electronic coupon image, even if distributed, would not be able to be redeemed. When the mobile device detects an attempt to capture the degraded electronic coupon image, the mobile device replaces or upgrades the degraded electronic coupon image with a non-degraded electronic coupon image. Thus, the device attempting to capture the electronic coupon can then properly capture and interpret the electronic coupon for redemption. This advantageously prevents a consumer from capturing the electronic coupon and distributing it to others so that the number of redemptions of the electronic coupon can be controlled. In addition, the mobile device can report to the coupon provider each attempted use, which provides useful analytics for anti-fraud and marketing purposes.

BRIEF DESCRIPTION OF THE DRAWINGS

FIG. 3A is a block diagram of an exemplary non-degraded electronic coupon image in accordance with the present invention; and FIGS. 3B-3G are block diagrams of exemplary degraded electronic coupon images in accordance with the present invention.

DETAILED DESCRIPTION OF THE DRAWINGS

Figure 1:
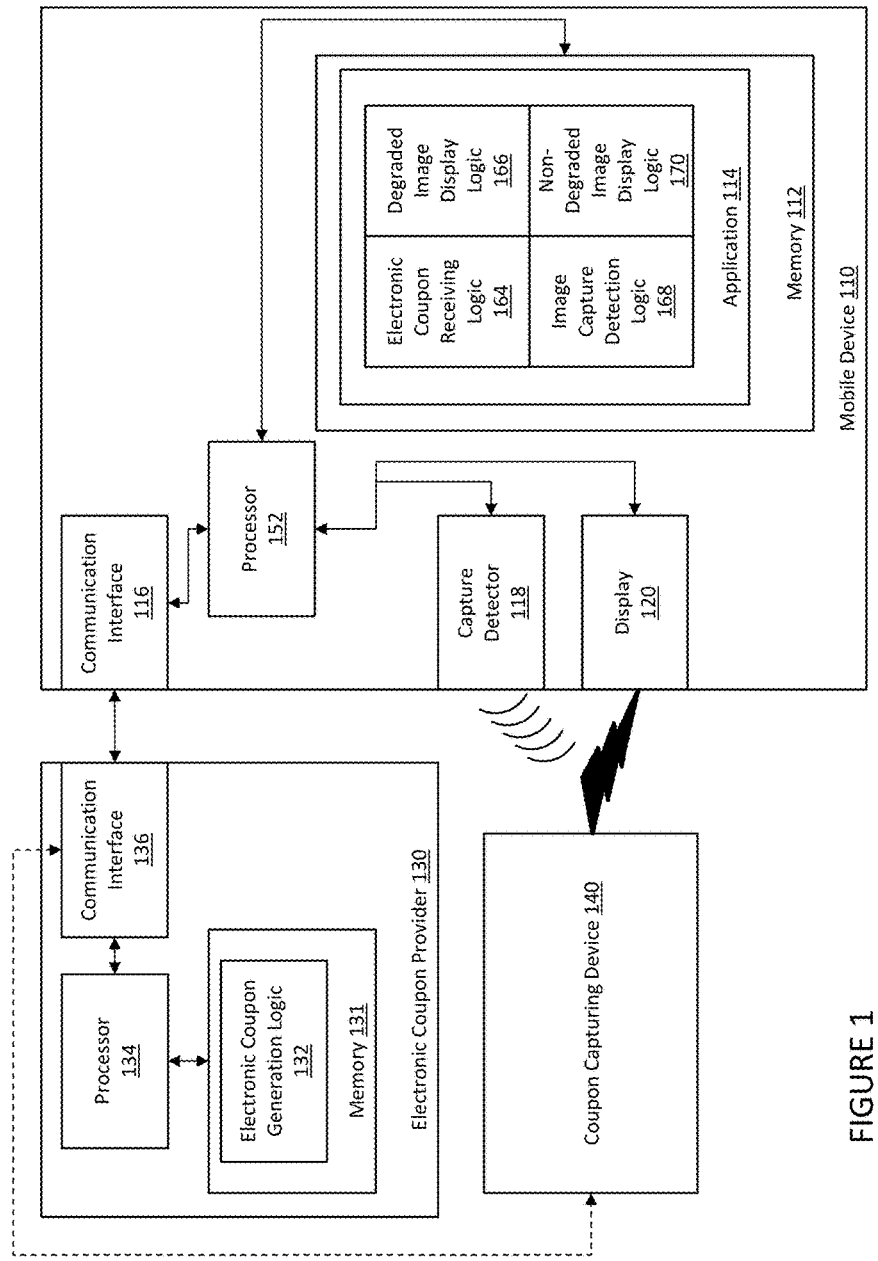
FIG. 1 is a block diagram of an exemplary system in accordance with the present invention.

FIG. 1 is a block diagram of an exemplary system in accordance with the present invention. The exemplary system includes a mobile device 110 that can receive an electronic coupon from electronic coupon provider 130. The electronic coupon provided by the electronic coupon provider 130 can include a degraded and non-degraded image of the electronic coupon and/or it can be a non-degraded image and the mobile device 110 can create the degraded image. Regardless, as will be described in more detail below, the display 120 of the mobile device 110 will display the degraded image of the electronic coupon unless and capture detector 118 detects an attempt to capture the electronic coupon, at which time display 120 will display the non-degraded image of the electronic coupon.

The mobile device 110 can be any type of device, including a cellular telephone, smart phone, personal digital assistant (PDA), computer, tablet, slate, and/or the like. The mobile device 110 includes a memory 112 that can store one or more applications 114, which applications are executed by processor 152. Application 114 is an electronic coupon application with logic 164-170 for controlling the receipt and display of degraded and non-degraded versions of the electronic coupon.

Processor 152 is connected to communication interface 116, which can be one or more communication interfaces that support wired and/or wireless communications. For example, communication interface 116 can support wide area network cellular wireless communications (e.g., CDMA, LTE, GSM, WiMAX, etc.) and short-range wireless communication (e.g., Bluetooth, near-field communications (NFC), RF-ID, infrared (IR), WiFi, etc.). As illustrated, communication interface 116 can be used to communicate with electronic coupon provider 130 to receive electronic coupons and inform the electronic coupon provider of coupon redemptions. The mobile device also includes a display 120, which can display, among other things, an electronic coupon to an operator of the mobile device and to a coupon capturing device 140.

Coupon capturing device 140 can be any type of device capable of capturing an electronic coupon. For example, coupon capturing device 140 can be a laser barcode scanner that produces a laser light the scans across a barcode on the electronic coupon in order to capture and interpret the barcode. Interpreting the barcode should be understood as decoding the barcode to produce the data represented by the barcode. It will be appreciated by those skilled in the art that the term barcode is a generic term used to refer to both codes represented by a series of bars (sometimes referred to as 1-D or linear codes), as well as two-dimensional codes (such as codes comprises of a series of shapes along a two-dimensional axis, such shapes including rectangles, dots, hexagons, and other geometric shapes). As an alternative to a laser barcode scanner, other wireless communication technologies can be employed, such as using Near Field Communication (NFC), Bluetooth, Radio-Frequency Identification (RF-ID), Wi-Fi, and/or the like.

Coupon capturing device 140 can communicate with electronic coupon provider 130 to inform the coupon provider when a coupon has been redeemed. Alternatively, mobile device 110 can inform electronic coupon provider 130 when an electronic coupon has been redeemed, which can be controlled by application 114. This alternative is advantageous because the application 114 is already configured for communicating with electronic coupon provider 130 to receive electronic coupons, and thus does not require coupon capturing device 140 to have a communication link to electronic coupon provider 130.

Electronic coupon provider 130 includes a processor 134 operatively coupled to a memory 131 and a communication interface 136, which can be one or more communication interfaces that support the same or different types of wired and/or wireless communications as communication interface 116 of mobile device 110. Memory 131 stores one or more programs embodied as logic 132, which is executed by processor 134 to perform certain functions, which will be described in more detail below.

The various processors described above can be microprocessors, field programmable gate arrays (FPGA), and/or application specific integrated processors (ASIC). These various processors are specifically programmed to carry out the functions disclosed and claimed in the present application.

Although FIG. 1 illustrates a single mobile device 110 interacting with a single electronic coupon provider 130 and a coupon capturing device 140, the present invention is not so limited. For example, mobile device 110 can interact with more than one electronic coupon provider 130 and electronic coupon provider 130 can interact with more than one mobile device 110. Similarly, mobile device 110 can interact with more than one coupon capturing device 140 and coupon capturing device 140 can interact with more than one mobile device. Moreover, electronic coupon provider 130 can interface with more than one code generator server 150 and code generator server 150 can interact with more than one electronic coupon provider 130.

Figure 2:
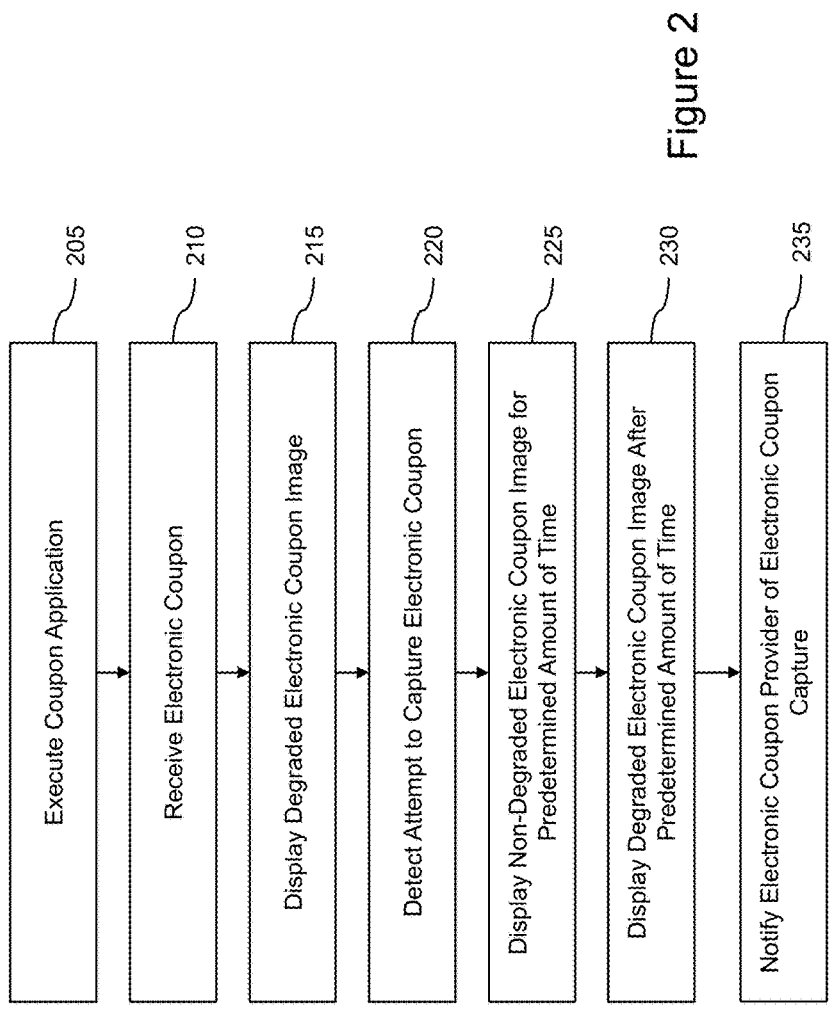
FIG. 2 is a flow diagram of an exemplary method in accordance with the present invention.

FIG. 2 is a flow diagram of an exemplary method in accordance with the present invention. Initially, processor 152 of mobile device 110 executes coupon application 114 (step 205). Electronic coupon provider uses logic 132 to generate electronic coupons, which can be distributed to one or more mobile devices via communication interface 136. Accordingly, when communication interface 116 of mobile device 110 receives an electronic coupon from electronic coupon provider 130, logic 164 of application 114 processes the received coupon and stores it in memory 112 (step 210). The electronic coupon received from electronic coupon provider 130 can include both a degraded and non-degraded image of the coupon or can include only a non-degraded image and logic 166 of application 114 can generate a degraded image using the received non-degraded image.

The degraded image of the electronic coupon is essentially a version of the non-degraded image that has been altered to prevent the coupon capturing device 140 from being able to properly interpret the data represented by the coupon. The degraded and non-degraded coupon images will be better understood in the context of FIGS. 3A-3G, which will now be described.

Figure 3G:
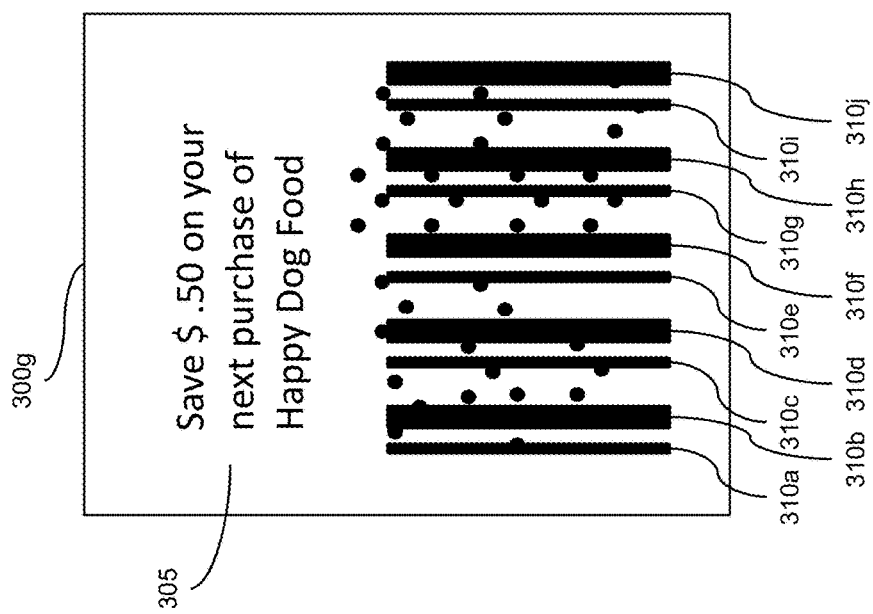

FIG. 3A is a block diagram of an exemplary non-degraded electronic coupon image in accordance with the present invention. The non-degraded electronic coupon image 300a includes some text 305 and a barcode composed of individual bars 310a-310j. This non-degraded electronic coupon image is displayed when scanning of the coupon is detected. Otherwise, a degraded electronic coupon image, such as those illustrated in FIGS. 3B-3G, are displayed.

FIGS. 3B-3G are block diagrams of exemplary degraded electronic coupon images in accordance with the present invention. The degraded electronic coupon image 300b in FIG. 3B has some of bars removed, i.e., bars 310b and 310d. Thus, scanning this degraded image would not result in a recognized barcode.

FIGS. 3C and 3D illustrate another technique for producing degraded electronic coupon images. Specifically, the images in these figures are alternatively displayed so that a screen capture would only obtain half of the bars of the barcode. Thus, a screen capture when the degraded image in FIG. 3C is displayed would only obtain bars 310a, 310c, 310e, 310g, and 310i, and a screen capture when the degraded image of FIG. 3D is displayed would only obtain the alternate bars, namely boards 310b, 310d, 310f, 310h, and 310j.

FIG. 3E illustrates a degraded electronic coupon image in which the bars 310a-310j are lightened so that they could not be properly read or interpreted by a scanner. FIG. 3F illustrates a degraded electronic coupon image in which the bars are obscured by blurring, thus preventing the proper interpretation of the barcode by a scanner. Finally, FIG. 3G illustrates a degraded electronic coupon image that includes added background noise, which is represented by the black dots in the figure.

It should be recognized that the particular techniques for producing a degraded electronic coupon image are merely exemplary and should not be interpreted as limiting the present invention. Thus, for example, the alternative display of the bars in FIGS. 3C and 3D need not be every other bar. Instead one degraded coupon image could include the left half of the bars and the other degraded coupon image, which is alternately displayed, could include the right half of the bars. Further, the illustration of a linear one-dimensional barcode is merely exemplary and the present invention is equally applicable to two-dimensional barcodes.

Returning to FIG. 2, whenever application 114 is requested to display the electronic coupon, logic 166 produces a degraded image of the electronic coupon on display 120 (step 215). Capture detector 118 provides captured information to logic 168, which detects when there is an attempt to capture the displayed electronic coupon (step 220). When an attempt to capture is detected, logic 170 displays the non-degraded electronic coupon image for a predetermined amount of time (step 225). Capture detector can be any type of device capable of detecting an attempt to capture the electronic coupon, such as the camera that is already present in the mobile device 110 for other purposes. In this case, capture detector would include a camera module that passes information to processor 152, which then uses logic 168 to determine whether the captured information corresponds to an attempt to capture the electronic coupon, such as the detection of laser light having a wavelength that is typical of check-out scanners.

After the predetermined amount of time has passed, logic 166 controls the display 120 to again display the degraded electronic coupon image (step 230). The predetermined amount of time can be a value that is sufficiently long to ensure that the non-degraded electronic coupon image can be captured. Alternatively, the non-degraded electronic coupon image can be displayed as long as the capture detector 118 detects an attempt to capture the electronic coupon image and when capture detector 118 no longer detects such an attempt it then informs processor 152, which controls the display to display the degraded electronic coupon image.

The change in the display of the electronic coupon between degraded and non-degraded images can involve replacing the degraded image with the non-degraded image and vice-versa. As an alternative to replacing one image with another, mobile device 110 can modify the images so that the degradation added to the electronic coupon is removed and/or the image is upgraded so that the non-degraded image is displayed. In this alternative the degraded images of FIGS. 3B-3D could be upgraded by adding the missing barcodes; the degraded image of FIG. 3E could have the degradation removed by darkening the barcodes; the degraded image of FIG. 3F could have the degradation removed by unblurring the barcode; and the degraded image of FIG. 3G could have the degradation removed by removing the added background noise.

The mobile device 110 and/or the coupon capturing device 140 can then notify the electronic coupon provider of the capture of the electronic coupon (step 235). This notification allows the electronic coupon provider 130 to track usage of the coupon and inform the coupon capturing device 130 and/or mobile device 110 whether the electronic coupon is still valid for redemption. For example, if the coupon is a single-use coupon the electronic coupon provider 130 determine whether the electronic coupon has previously been redeems; if it has, the coupon capturing device 140 and/or the mobile device 110 is informed that the electronic coupon is not valid; and if it has not, the coupon capturing device 140 and/or mobile device 110 can be informed that the coupon is valid and can mark the coupon as invalid to prevent further attempts to redeem the electronic coupon. Similar processing would occur for a multi-use coupon except that if the redemption attempt is less than the number of redemptions allowed for the electronic coupon then the electronic coupon provider 130 would increment the number of redemptions instead of immediately marking the electronic coupon as invalid.

Although the method of FIG. 2 illustrates the notification of the attempt to capture as occurring after the display has changed from displaying the non-degraded electronic coupon image to displaying the degraded electronic coupon image, these steps can be performed in parallel.

The barcodes displayed on the electronic coupons can be generated in any manner. For example, unique barcodes could be generated using techniques disclosed in U.S. Pat. Nos. 7,752,137, 7,917,443, 7,996,319, 8,280,817, and 8,615,470, the entire disclosures of which are herein expressly incorporated by reference. In this case the barcodes would be selected from a subset of barcodes, where the subset of barcodes are part of a large possible universe of barcodes that could be generated using parameters defining the barcode. Further, the electronic coupons can have a variable redemption characteristic, such as those disclosed in U.S. Provisional Application No. 61/836,918, filed Jun. 19, 2013, and U.S. patent application Ser. No. 14/265,979, which filed on even date herewith and which claims priority to U.S. Provisional Application No. 61/836,918, the entire disclosures of which are herein expressly incorporated by reference.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising:
receiving, by an application executed on a mobile device, an electronic coupon;
creating, by the mobile device, an intentionally degraded image of the electronic coupon;
displaying, on a display screen of the mobile device, the intentionally degraded image of the electronic coupon responsive to a request to display the electronic coupon;
detecting, by the mobile device, an attempt to capture the displayed, intentionally degraded image of the electronic coupon; and
replacing, on the display screen on the mobile device based on the detection of the attempt to capture, the displayed, intentionally degraded image of the electronic coupon with a non-degraded image of the electronic coupon.

2. The method of claim 1, wherein the electronic coupon includes a first barcode and the creation of the intentionally degraded image involves removing some bars of the first barcode so that a barcode displayed in the intentionally degraded image of the electronic coupon does not include all of the bars of the first barcode.

3. The method of claim 1, wherein the electronic coupon includes a first barcode and the creation of the intentionally degraded image involves changing a size of bars in the first barcode so that a barcode displayed in the intentionally degraded image of the electronic coupon includes bars with different sizes than corresponding bars of the first barcode.

4. The method of claim 1, wherein the creation of the intentionally degraded image involves introducing background noise into the electronic coupon so that the intentionally degraded image of the electronic coupon includes more background noise than the non-degraded image of the electronic coupon.

5. The method of claim 1, wherein the creation of the intentionally degraded image of the electronic coupon involves creating alternating display of portions of the coupon that together form the non-degraded image in a single display of the entire coupon.

6. The method of claim 1, wherein the creation of the intentionally degraded image involves adjusting a contrast of the electronic coupon so that the intentionally degraded image of the electronic coupon is lighter than the non-degraded image of the electronic coupon.

7. A method, comprising:
receiving, by an application executed on a mobile device, an electronic coupon;
displaying, on a display screen of the mobile device, a degraded image of the electronic coupon;
detecting, by the mobile device, an attempt to capture the displayed, degraded image of the electronic coupon based on receipt of laser scanner light; and
displaying, on the display screen on the mobile device based on the detection of the attempt to capture, a non-degraded image of the electronic coupon.

8. The method of claim 1, wherein the detection of the attempt to capture is based on receipt of a wireless signal.

9. The method of claim 8, wherein the wireless signal is a Near Field Communication (NFC) signal.

10. The method of claim 8, wherein the wireless signal is a Bluetooth signal.

11. The method of claim 8, wherein the wireless signal is a radio-frequency identification (RF-ID) signal.

12. The method of claim 8, wherein the wireless signal is a Wi-Fi signal.

13. The method of claim 1, further comprising:
informing an electronic coupon provider of the attempt to capture the intentionally degraded image of the electronic coupon.

14. The method of claim 13, wherein the mobile device informs the coupon provider of the attempt to capture the intentionally degraded image of the electronic coupon.

15. The method of claim 13, wherein a device attempting to capture the intentionally degraded image of the electronic coupon informs the coupon provider of the attempt to capture the intentionally degraded image of the electronic coupon.

16. A mobile device, comprising:
a display screen;
a capturing detector;
a memory; and
a processor coupled to the display screen, capturing detector, and memory, wherein processor is configured to execute an application that causes the processor to
receive an electronic coupon;
create an intentionally degraded image of the electronic coupon;
control the display screen of the mobile device to display the intentionally degraded image of the electronic coupon in response to a request to display the electronic coupon;
detect, based on a signal received from the capturing detector of the mobile device, an attempt to capture the displayed, intentionally degraded image of the electronic coupon; and
control the display screen of the mobile device to replace, based on the detection of the attempt to capture, the displayed, intentionally degraded image of the electronic coupon with a non-degraded image of the electronic coupon.

17. The mobile device of claim 16, wherein the capturing detector is an imaging module of the mobile device.

18. The method of claim 1, further comprising:
displaying the intentionally degraded image of the electronic coupon a predetermined amount of time after displaying the non-degraded image of the electronic coupon.

19. The method of claim 1, wherein the non-degraded image of the electronic coupon is displayed while the attempt to capture is detected, the method further comprising:
displaying the intentionally degraded image of the electronic coupon instead of the non-degraded image when the attempt to capture is no longer detected.

20. The mobile device of claim 16, wherein the execution of the application by the processor causes the processor to:
display the intentionally degraded image of the electronic coupon a predetermined amount of time after displaying the non-degraded image of the electronic coupon.

21. The mobile device of claim 16, wherein the execution of the application by the processor causes the processor to
display the non-degraded image of the electronic coupon while the attempt to capture is detected; and
display the intentionally degraded image of the electronic coupon instead of the non-degraded image when the attempt to capture is no longer detected.

* * * * *